No. 839,736. PATENTED DEC. 25, 1906.
A. DE VILBISS, Jr.
COMPUTING SCALE.
APPLICATION FILED APR. 9, 1901. RENEWED MAY 31, 1904.
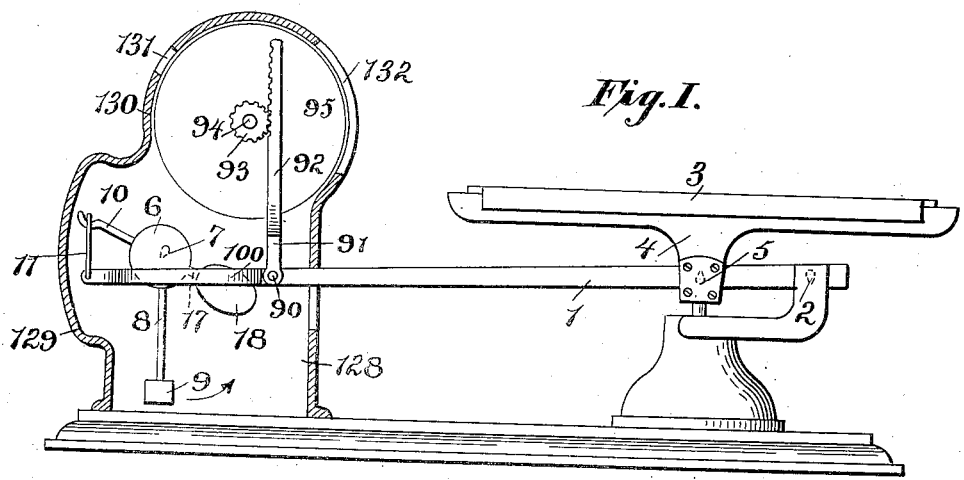
Fig. I.
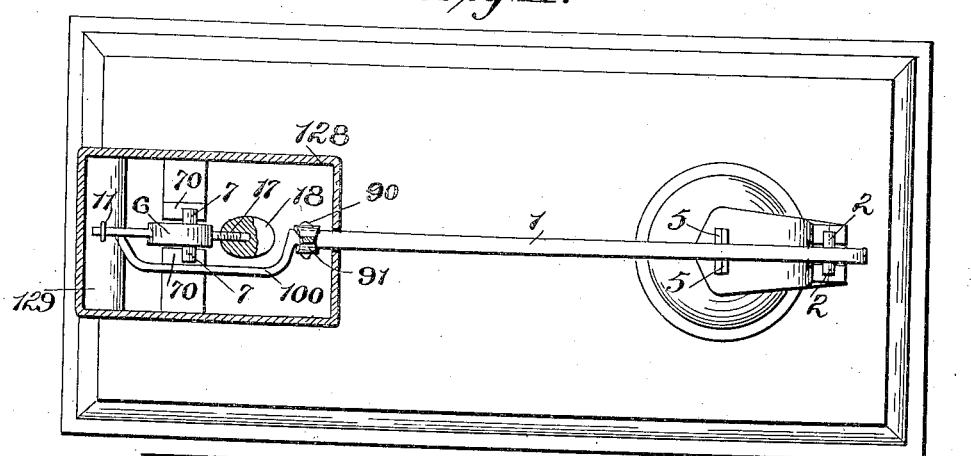
Fig. II.
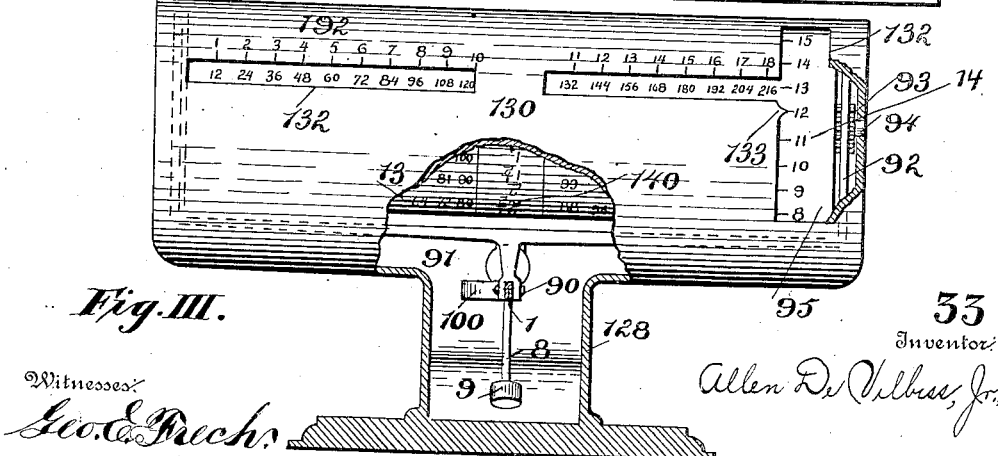
Fig. III.
Witnesses:
Geo. E. Rech.
F. R. Fitton.
Inventor:
Allen De Vilbiss, Jr.
By Collamer & Co., Attorneys.

UNITED STATES PATENT OFFICE.

ALLEN DE VILBISS, JR., OF TOLEDO, OHIO, ASSIGNOR, BY MESNE ASSIGNMENTS, TO TOLEDO COMPUTING SCALE COMPANY, A CORPORATION OF NEW JERSEY.

COMPUTING-SCALE.

No. 839,736.　　　　Specification of Letters Patent.　　　Patented Dec. 25, 1906.

Application filed April 9, 1901. Renewed May 31, 1904. Serial No. 210,406.

*To all whom it may concern:*

Be it known that I, ALLEN DE VILBISS, Jr., a citizen of the United States, and a resident of Toledo, Lucas county, State of Ohio, have invented certain new and useful Improvements in Computing-Scales, (Case No. 33;) and my preferred manner of carrying out the invention is set forth in the following full, clear, and exact description, terminating with claims particularly specifying the novelty.

This invention relates to scales of that class which compute or indicate the total weight and total price, preferably by means of a cylinder rotating on its axis within a casing which is provided with openings at suitable points to permit the dealer and the customer to see through them the results which it is desired shall be indicated; and the object of the present invention is to construct a scale of this type whose indicating mechanism, comprising the cylinder and the slotted casing, is combined with weighing mechanism substantially of the character covered by patents hitherto issued to me on this line of invention.

To this end the present invention consists in a construction of parts which shall adapt the indicating mechanism, above described, and the weighing mechanism to joint use in the simplest manner and whereby all necessary adjustments are permitted.

The following specification describes my preferred manner of carrying out the invention, whereas the claims embrace the salient points or combinations of elements, all as illustrated in the accompanying drawings, wherein—

Figure I is a side elevation of the weighing mechanism and a sectional view of the indicating mechanism. Fig. II is a plan view of this scale with the platform removed and the casing shown in section on a line through the main pivot. Fig. III is a longitudinal sectional view of the body portion of the casing with its drum-shaped housing partly broken away, so as to show the cylinder in elevation therein.

1 is the main scale-beam, fulcrumed at 2 on a support which rises from the base, and 3 is a pan or platform having a standard 4, pivotally supported, as at 5, upon said beam. The base supports a casing consisting of an upright body portion 128 (preferably having a rearward extension 129) and provided with a drum-shaped housing 130 at its top, which has openings 131 and 132 for a purpose to appear below.

6 is a disk having knife-edge bearings 7, supported upon blocks 70 within the body portion of the casing, and from this disk hangs rigidly a pendulum 8, having a weight 9 at its lower end. The scale-beam 1 is diverted from a straight line, as best seen at 100 in Fig. II, so that within the body portion of the casing it passes completely around the disk and the parts attached thereto and returns again to the line of its body, and at its extreme end a link 11 leads upwardly from this beam and is connected as by knife-edges, with a link-pivot 10, here shown as an arm projecting radially from the disk 6. From the latter, diametrically opposite the link-pivot, projects a counterbalance-arm 17, carrying a weight 18, the latter being sufficiently remote from the center 7 and of sufficient weight to counterbalance the weight of the link-pivot, the link, that end of the main beam, the pan or platform, and the connections hereinafter described by means of which the indicating mechanism is moved. As indicated in section in Fig. II, the arm 17 may be a screw and the weight 18 adjustable thereon, and I will hereinafter speak of this arm as a "screw."

In connection with a scale of the above type I preferably use indicating mechanism such as will now be described. Pivoted at 90 to the main beam is a fork 91, which extends upwardly and thence outwardly and then again upwardly into two arms 92, which are toothed, so that they constitute rack-bars. These engage the teeth of gears 93, mounted fast on the shaft 94 of the cylinder 95, rotatable within the housing 130; but it will be clear that any other suitable form of connections might be employed for converting an upward movement of the main beam 1 into a rotary movement of the cylinder. Herein where I speak of the devices shown as "connections" for this purpose I desire to be understood as including any equivalent devices for accomplishing this end.

The face of the cylinder is inscribed with a table 13, and in the present instance there are two bands around this cylinder, which are inscribed with weight-totals. Here one (numbered 14) is at one end, while the other (numbered 140) is at the center of the length of the cylinder, and the latter has its figures inverted and is exhibited through the opening 131 to the customer at the rear end of the scale. The endmost row of weight-totals here moves under a pointer 133 adjacent the opening 132, which is in the front side of the housing 130 or toward the dealer. On the front side of the housing adjacent the dealer is a row of figures 192, giving the various prices per pound, and the table 13 on the cylinder carries the total prices, which are so arranged thereon as to come under their respective prices per pound and be observable through the opening 132 when the proper weight-total 14 comes opposite the pointer 133. I do not limit myself to this exact arrangement; but I prefer it in scales of this type.

The operation is as follows: The commodity being placed upon the pan or platform 3, the outer end of the scale-beam 1 descends and through the link 11 causes a rotation of the disk 6 on its pivots 7, drawing the link pivot-arm 10 downwardly from its normal position, which is above that of the main pivot 7. This swings the weight 9 to the right, as indicated by the arrow, and lifts the counterbalance-weight 18 and the fork 91. I repeat that said weight 18 is of sufficient size and so adjusted on the screw 17 as to exactly counterbalance all parts of the scale when the latter is at rest. The pendulum 9 rises in proportion to the weight of the commodity, and the rack-bars 92 turn the gears 93 and rotate the cylinder 95 on its axis 94, as will be clear. The row 140 of weight-totals passing under the opening 131 is exposed to the customer, who may see that he obtains full weight, and meanwhile the row 14 of weight-totals passes under the pointer 133 and gives the same information to the dealer. With the present construction, however, that longitudinal row on the table 13 which corresponds to the total weight comes opposite the opening 132 on the dealer's side of the housing, and under the proper figure in the row 192 indicating the price per pound he can quickly see the total price. It is obvious that this arrangement of openings could be modified to some extent without departing from the spirit of my invention. The parts are of the desired sizes, shapes, proportions, and materials, and the invention may be used with or without other details which form no feature of the present case.

What is claimed as new is—

1. In computing-scales, the combination of a supporting-base, a scale-beam pivoted at or near one of its ends on said base, a platform pivotally mounted upon said beam inwardly beyond the latter's pivot, a substantially cylindrical casing mounted at an elevated position in rear of the platform over the rear end of the scale-beam and transverse thereto, said cylindrical casing being apertured in the side toward said platform above the plane of the top of the latter, a drum journaled in said casing with its axis transverse the beam and the latter centrally located with reference to said axis, said drum bearing weight and price inscriptions to show through said apertures of the casing, a gear-wheel secured to the drum, a rack-bar meshing with said gear-wheel and pivotally connected with the scale-beam where the latter extends below the drum, and load-counterbalancing means connected with the scale-beam in rear of the pivotal support thereon for the platform.

2. In computing-scales the combination of a supporting-base, a scale-beam pivoted at or near one of its ends on said base, a platform pivotally mounted upon said beam inwardly beyond the latter's pivot, a substantially cylindrical casing mounted at an elevated position in rear of the platform over the rear end of the scale-beam and transverse thereto, said cylindrical casing being apertured in the side toward said platform above the plane of the top of the latter, a drum journaled in said casing with its axis transverse the beam and the latter centrally located with reference to said axis, said drum bearing weight and price inscriptions to show through said apertures of the casing, gear-wheels secured to opposite ends of the drum, rack-bars meshing with said gear-wheels respectively and pivotally connected with the scale-beam where the latter extends below the drum, and load-counterbalancing means connected with the scale-beam in rear of the pivotal support thereon for the platform.

3. In computing-scales, the combination of a suitable supporting-base, a transversely-extending slotted cylindrical casing supported in elevated position at the rear part of said base, a rotary indicating drum or cylinder within said casing, a scale beam or lever fulcrumed at or near one of its ends on the forward part of the supporting-base and extending rearwardly at right angles to the axis of the said drum or cylinder to a point below the middle of the latter, a gear-wheel carried by said cylinder, a rack-bar engaging said gear-wheel, means pivotally connecting the rack-bar with the scale-beam where the latter extends below the cylinder, a platform pivotally supported upon said scale-beam in rear of the latter's fulcrum and centrally located in front of the indicating-cylinder below the slots in the latter's casing, and means operating automatically to counterbalance that portion of the scale-beam extending in rear of its fulcrum and the parts connected therewith which tend to depress it thus normally maintaining the indicating-cylinder at zero position, with provisions for a varying automatic augmentation to counterbalance varying loads placed upon the platform and to correspondingly limit the resultant rotation of the cylinder so that the correct indication of weight and price may be exhibited through the slots of the casing.

4. In computing-scales, the combination of a suitable supporting-base, a transversely-extending slotted cylindrical casing supported in elevated position at the rear part of said base, a rotary indicating drum or cylinder within said casing, a scale beam or lever fulcrumed at or near one of its ends on the forward part of the supporting-base and extending rearwardly at right angles to the axis of the said drum or cylinder to a point below the middle of the latter, gear-wheels carried by the cylinder at its opposite ends, rack-bars connected together to operate in unison and engaging said gear-wheels respectively, means pivotally connecting the rack-bars with the scale-beam where the latter extends below the cylinder, a platform pivotally supported upon said scale-beam in rear of the latter's fulcrum and centrally located in front of the indicating-cylinder below the slots in the latter's casing, and means operating automatically to counterbalance that portion of the scale-beam extending in rear of its fulcrum and the parts connected therewith which tend to depress it, thus normally maintaining the indicating-cylinder at zero position, with provisions for a varying automatic augmentation to counterbalance varying loads placed upon the platform and to correspondingly limit the resultant rotation of the cylinder so that the correct indication of weight and price may be exhibited through the slots of the casing.

5. In a scale, the combination with indicating mechanism of rotary character, the pan, the main beam, and connections between said beam and the indicating mechanism for turning the latter proportionately to the movements of the former; of a disk, a main pivot therefor, a pendulum carried thereby, a link pivot-arm supported by and projecting beyond the periphery of the disk, a link connecting this pivot-arm with the beam, and a counterbalance-weight projecting beyond the periphery of the disk opposite the link pivot-arm and of a size adapted to counterbalance all movable parts which are not supported on their own pivots.

6. In a scale, the combination with indicating mechanism of rotary character, the main beam, and connections between said beam and the indicating mechanism for turning the latter by the former; of a main pivot, a pendulum hanging rigidly therefrom, a rigid arm passing through said pivot at an oblique angle to the pendulum and having a link pivot-arm at one end and a screw at the other, a link connecting the link pivot-arm and the main beam, and a counterbalance-weight adjustable on said screw and of a size adapted to counterbalance all movable parts which are not supported on their own pivots.

7. In a scale, the combination with indicating mechanism of rotary character, weighing mechanism including the main beam, and connections between said beam and the indicating mechanism for turning the latter by the descent of one end of the former; of a main pivot, a pendulum hanging rigidly therefrom, a link pivot-arm projecting from the main pivot and standing normally above the latter, a link connecting the link pivot-arm with the descending end of the main beam, and a single adjustable weight carried by the main pivot opposite said link pivot-arm for counterbalancing all movable parts which are not supported on their own pivots.

8. In a scale, the combination with indicating mechanism of a rotary character mounted on an axis, a gear thereon, the weighing mechanism including a main beam diverted from the line of its straight body, a pivot standing within the divergent portion of the beam, a pendulum hanging therefrom, and connections at one side of said pivot between the pendulum and the beam; of a rack-bar pivoted to the beam at the other side of said pivot with its teeth engaging the gear of the indicating mechanism, and means for counterbalancing all movable parts which are not supported on their own pivots.

9. In a scale, the combination with indicating mechanism of a rotary character mounted on an axis, a gear thereon, the weighing mechanism including a main beam diverted from the line of its straight body, a pivoted disk standing within the divergent portion of the beam, a pendulum hanging from the disk, an arm projecting from the disk, and connections between the latter and the beam; of a rack-bar pivoted to the beam independent of said connections and having its teeth engaging the gear of the indicating mechanism, and means for counterbalancing all movable parts which are not supported on their own pivots.

10. In a scale, the combination with the casing having a plurality of openings, a cylinder journaled on a horizontal axis therein and inscribed on its face with figures to move under said openings, certain of the figures being inverted with respect to the remainder in order to permit their reading from the opposite side of the casing, the weighing mechanism including a main beam, and a fork whose stem is pivoted to the latter and whose arms are connected with the hubs of the cylinder so as to rotate it as the beam moves; of a pendulum mounted on a main pivot, a link pivot-arm projecting from the latter, a link connecting the link pivot-arm with the main beam, and means for counterbalancing the weight of all movable parts which are not supported on their own pivots.

11. In a scale, the combination with the casing having openings, a cylinder journaled on a horizontal axis therein and inscribed on its face with figures to move under said openings, the weighing mechanism including a main beam diverted from the line of its straight body, and a fork whose stem is pivoted to the main beam and whose arms are connected with the hubs of the cylinder so as to rotate it as the beam moves; of a pendulum mounted on a main pivot, a link pivot-arm projecting from the latter, a link connecting the link pivot-arm with the main beam, a counterbalance-arm projecting from the main pivot opposite the link pivot-arm, and a counterbalance-weight thereon of a size to offset the weight of the link pivot-arm, the link, the main beam, the platform, the fork, and its connections, all substantially as described.

In testimony whereof I have hereunto subscribed my signature this 1st day of April, A. D. 1901.

ALLEN DE VILBISS, Jr.

Witnesses:
  EMMA EIBEN,
  MAE TUTTLE.